(No Model.)
J. S. KLEIN.
PIPE COUPLING.
No. 365,388. Patented June 28, 1887.
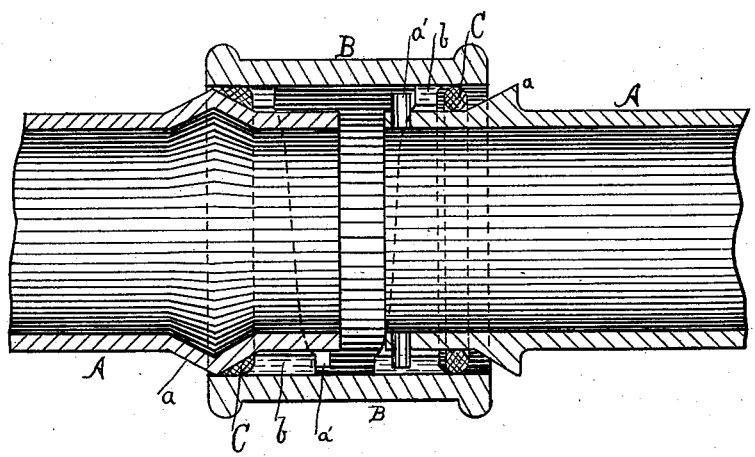
Witnesses,
Wm. M. Wilkie
Rob't N. Porter.
Inventor,
John S. Klein
Per Hallock & Hallock
Att'ys.
N. PETERS, Photo-Lithographer, Washington, D. C.

UNITED STATES PATENT OFFICE.

JOHN S. KLEIN, OF OIL CITY, PENNSYLVANIA.

PIPE-COUPLING.

SPECIFICATION forming part of Letters Patent No. 365,388, dated June 28, 1887.

Application filed June 9, 1886. Serial No. 204,644. (No model.)

*To all whom it may concern:*

Be it known that I, JOHN S. KLEIN, a citizen of the United States, residing at Oil City, in the county of Venango and State of Pennsylvania, have invented certain new and useful Improvements in Pipe-Couplings; and I do hereby declare the following to be a full, clear, and exact description of the invention, such as will enable others skilled in the art to which it appertains to make and use the same.

This invention relates to means for coupling conduit-pipes; and it consists in certain improvements in the construction of the same, as will be hereinafter fully described, and pointed out in the claim.

The object of my invention is to provide a pipe-coupling for gas, water, and other conduit pipes which will operate without screw-threading the pipe, and which will utilize the pressure of the contained fluid to assist in maintaining a tightly-packed joint.

My device is applicable to both cast and wrought pipe; but it is particularly advantageous when applied to wrought pipe, because it permits the use of much thinner pipe than can be used where the coupling is made by screw-threading the pipe.

In a companion application filed June 9, 1886, and numbered 204,516, I have shown and described my present device in connection with others for the same purpose, and in that application I declared my intention to specifically claim this construction in a separate application.

My device is illustrated in the accompanying drawing by a single figure, which is a longitudinal section through the same.

A A are the pipe sections; B, the coupling-collar; C, the packing-gaskets.

*a a* are enlargements on the pipes near their ends.

*a' a'* are lugs or pins on the ends of the pipes.

*b* are ribs on the inside of the collar.

The enlargements *a a* on the two pipe ends shown are different in form. The one on the right of the figure is intended to show how the enlargement would be made on a cast-metal pipe, while that on the left shows how a wrought-metal pipe may be bulged or expanded to form the enlargement.

The collar, it will be seen, is of sufficient caliber to receive the enlarged part of the pipe, except when it is ribbed inside, and then it will receive only the enlarged end of the pipe. The ribs *b b* on the inner wall of the collar are straight on their outer faces or shoulder, thus presenting a seat for the packing ring or gasket C, which is of yielding and impervious material, and on their inner shoulders they are made tapering or cam form, and there are spaces left in them for the passage of the pins *a'* on the ends of the pipe.

It will be seen that by turning the pipe or collar after the pipe is entered the cam-surfaces of the ribs *b* will bear on the pins *a'* and draw the pipe into the collar. On the right of the figure the pipe is shown as just entered, while on the left it is shown as drawn in by the turning of the pipe or collar.

The manner of forming a coupling with my joint is as follows: The packing-rings are put over the ends of the pipes, then the pipes are inserted in the collar, and then either the collar is turned and the pipes held or else the collar is held and the pipes are turned, and thus the packing is compressed in the space between the ribs *b* and the enlargements *a*, and a tight joint is thus effected.

It will be observed that the contained fluid acts upon the packing to press it closer into the joint it is packing, and therefore leakage cannot occur.

What I claim as new is—

In a pipe-coupling, the combination of the collar B, having internal ribs, *b*, with cam-faces on their inside shoulders and a packing-seat on their outside shoulders, the pipes A, having enlargements *a* and pins *a'* in the positions shown, and the packing C, inserted between the ribs *b* and enlargements *a*.

In testimony whereof I affix my signature in presence of two witnesses.

JOHN S. KLEIN.

Witnesses:
ROBT. H. PORTER,
JNO. K. HALLOCK.